United States Patent Office 3,470,195
Patented Sept. 30, 1969

---

3,470,195
PHENYL AND BENZYL OXAZOLE ACETIC ACID COMPOUNDS
Derrick Michael O'Mant, Macclesfield, England, assignor to Imperial Chemical Industries Limited, London, England, a corporation of Great Britain
No Drawing. Filed Sept. 1, 1967, Ser. No. 664,941
Claims priority, application Great Britain, Sept. 30, 1966, 43,786/66
Int. Cl. C07d *85/44*; A61k *27/00*
U.S. Cl. 260—307        3 Claims

ABSTRACT OF THE DISCLOSURE

This disclosure relates to phenyl-(and benzyl-)oxazolyl-alkanoic acids and derivatives thereof which possess anti-inflammatory, analgesic and antipyretic activity. The disclosure also relates to processes for making these compounds, to pharmaceutical compositions comprising at least one of said compounds, and to methods of treatment involving said compounds. A representative of said compounds is 2-(4-chlorophenyl)oxazol-4-ylacetic acid.

---

This invention relates to heterocyclic compounds and more particularly it relates to new oxazole derivatives which have anti-inflammatory, analgesic, and antipyretic activity.

According to the invention we provide oxazole derivatives of the formula:

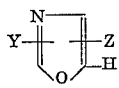

wherein Y stands for a phenyl or benzyl radical, either of which may optionally be substituted in the benzene ring by not more than two halogen atoms or by the trifluoromethyl radical, and Z stands for a group of the formula —$CR^1R^2R^3$, wherein $R^1$ stands for hydrogen or an alkyl radical of not more than 3 carbon atoms, and $R^2$ stands for hydrogen, an alkyl radical of not more than 3 carbon atoms, or an alkoxycarbonyl radical of not more than 6 carbon atoms, and $R^3$ stands for a group of the formula —$CO_2R^4$ or —$CONHR^5$, wherein $R^4$ stands for hydrogen or an alkyl, dialkylaminoalkyl, benzyl or phenyl radical, and $R^5$ stands for hydrogen or a hydroxy, amino (—$NH_2$), dialkylaminoalkyl, alkoxycarbonylalkyl or carboxyalkyl radical, and salts thereof.

The oxazole nucleus is numbered as follows:

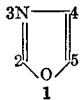

It will be readily understood from the above formula of the oxazole derivatives of the invention that when Y is linked to position 2 then Z is linked to position 4, and when Y is linked to position 4 then Z is linked to position 2.

The halogen substituent(s) which may optionally be present in Y may, for example, be selected from fluorine, chlorine and bromine atoms.

As a suitable value for $R^1$ or $R^2$ when either stands for an alkyl radical of not more than 3 carbon atoms, there may be mentioned, for example, the methyl radical. As a suitable value for $R^2$ when it stands for an alkoxycarbonyl radical there may be mentioned, for example, the ethoxycarbonyl radical.

As a suitable value for $R^4$ when it stands for an alkyl radical there may be mentioned, for example, an alkyl radical of not more than 5 carbon atoms, for example the methyl, ethyl or n-butyl radical. As a suitable value for $R^4$ when it stands for a dialkylaminoalkyl radical there may be mentioned, for example, a dialkylaminoalkyl radical of not more than 8 carbon atoms, for example the 2-dimethylaminoethyl radical.

As a suitable value for $R^5$ when it stands for a dialkylaminoalkyl radical there may be mentioned, for example, a dialkylaminoalkyl radical of not more than 8 carbon atoms, for example the 3-dimethylaminopropyl radical. As a suitable value for $R^5$ when it stands for an alkoxycarbonylalkyl radical there may be mentioned, for example, an alkoxycarbonylalkyl radical of not more than 5 carbon atoms, for example the methoxycarbonylmethyl radical. As a suitable value for $R^5$ when it stands for a carboxyalkyl radical there may be mentioned, for example, a carboxyalkyl radical of not more than 3 carbon atoms, for example the carboxymethyl radical.

As suitable salts in the case where Z stands for an ester or amide group (the latter including inter alia hydrazides) there may be mentioned pharmaceutically-acceptable acid-addition salts, for example hydrochlorides, hydrobromides, sulphates or phosphates. In the case where the substituent Z contains the carboxy radical, suitable salts are salts with alkali metals or alkaline earth metals, or aluminium or ammonium salts, or salts with organic bases which afford non-toxic, pharmaceutically-acceptable cations.

Preferred oxazole derivatives of this invention are 2-(4 - chlorophenyl)oxazol-4-ylacetic acid, α-[2-(4-chlorophenyl)oxazol-4-yl]propionic acid, 2-(4-trifluoromethylphenyl)oxazol-4-ylacetic acid and 2-(4-bromophenyl)oxazol-4-ylacetic acid, and alkali metal, alkaline earth metal, and aluminium salts thereof.

According to a further feature of the invention we provide a process for the manufacture of oxazole derivatives of the formula:

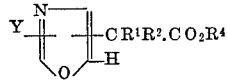

wherein $R^1$ and $R^2$ stand for hydrogen or an alkyl radical of not more than 3 carbon atoms, $R^4$ stands for an alkyl, benzyl or phenyl radical, and Y has the meaning stated above, which comprises reacting a compound of the formula:

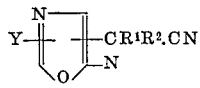

wherein Y, $R^1$ and $R^2$ have the meanings stated above, or the corresponding amide (—$CR^1R^2 \cdot CONH_2$), and a compound of the formula $R^4OH$, wherein $R^4$ has the meaning stated above, under acidic conditions.

The acidic conditions may be provided by, for example, the presence of concentrated sulphuric acid. The interaction may be carried out in a diluent or solvent which may be, for example, an excess of the compound of formula $R^4OH$, wherein $R^4$ has the meaning stated above, for example methanol, ethanol or n-butanol. The interaction may be accelerated or completed by the application of heat.

The nitriles used as starting materials may be obtained in conventional manner by reacting an alkali metal cyanide with the corresponding halogenalkyl derivative in a diluent or solvent, for example aqueous 2-ethoxyethanol, and under the influence of heat. The halogenoalkyl derivatives themselves may likewise be obtained in conventional manner.

According to a further feature of the invention we provide a process for the manufacture of oxazole derivatives of the formula:

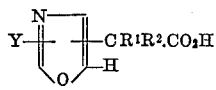

wherein Y has the meaning stated above, and $R^1$ and $R^2$ stand for hydrogen or an alkyl radical of not more than 3 carbon atoms, and salts thereof, which comprises hydrolysing a compound of the formula:

wherein Y, $R^1$ and $R^2$ have the meanings stated above and $R^4$ stands for an alkyl, benzyl or phenyl radical.

As a suitable hydrolytic agent there may be mentioned, for example, an inorganic base, for example an alkali metal hydroxide, or an acid, for example an inorganic acid, for example sulphuric acid. The hydrolysis may be accelerated or completed by the application of heat. The hydrolysis is carried out in the presence of water, and an organic solvent, for example ethanol, may optionally be present.

According to a futrher feature of the invention we provide a process for the manufacture of oxazole derivatives of the formula:

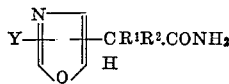

wherein Y has the meaning stated above, and $R^1$ and $R^2$ stand for hydrogen or an alkyl radical of not more than 3 carbon atoms, and salts thereof, which comprises hydrolysing a compound of the formula:

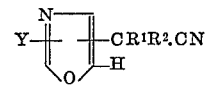

wherein Y, $R^1$ and $R^2$ have the meanings stated above.

As a suitable hydrolytic agent there may be mentioned, for example, an acid, for example an inorganic acid, for example sulphuric acid.

According to a further feature of the invention we provide a process for the manufacture of oxazole derivatives of the formula:

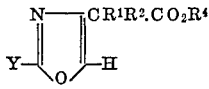

wherein Y, $R^1$ and $R^2$ have the meanings stated above, and $R^4$ stands for an alkyl, dialkylaminoalkyl, benzyl or phenyl radical, and salts thereof, which comprises reacting a compound of the formula $Y \cdot CO \cdot NH_2$, wherein Y has the meaning stated above, with a compound of the formula:

$$Hal \cdot CH_2 \cdot CO \cdot CR^1R^2 \cdot CO_2R^4$$

wherein $R^1$, $R^2$ and $R^4$ have the meanings stated above, and Hal stands for a halogen atom.

As a suitable value for Hal there may be mentioned, for example, a chlorine, bromine or iodine atom. The reaction may be accelerated or completed by the application of heat, and it may optionally be carried out in a diluent or solvent.

According to a further feature of the invention we provide a process for the manufacture of oxazole derivatives of the formula:

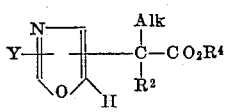

wherein Y, $R^2$ and $R^4$ have the meanings stated above, and Alk stands for an alkyl radical of not more than 3 carbon atoms, which comprises alkylating a compound of the formula:

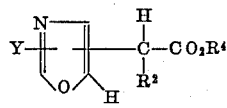

wherein Y, $R^2$ and $R^4$ have the meanings stated above.

It is to be understood that this alkylation process can result in the introduction of one α-alkyl substituent or two α-alkyl substituents (i.e. the case where $R^2$ in the starting material stands for hydrogen, and in the product stands for an alkyl radical). The alkylation may be carried out by the interaction of an alkali metal derivative of the appropriate oxazole derivative with an alkyl halide of not more than 3 carbon atoms, for example methyl iodide. The reaction may be carried out in a diluent or solvent, for example ether, tetrahydrofuran or dimethylformamide.

According to a further feature of the invention we provide a process for the manufacture of oxazole derivatives of the formula:

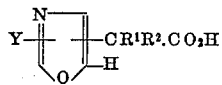

wherein Y has the meaning stated above, and $R^1$ and $R^2$ stand for hydrogen or an alkyl radical of not more than 3 carbon atoms, and salts thereof, which comprises hydrolysing a compound of the formula:

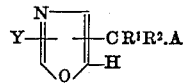

wherein Y, $R^1$ and $R^2$ have the meanings stated above, and A stands for the cyano (—CN) or carbamoyl (—$CONH_2$) radical.

As a suitable hydrolytic agent there may be mentioned an inorganic base, for example an alkali metal hydroxide, for example sodium or potassium hydroxide. The hydrolysis is carried out in the presence of water, and an organic solvent, for example ethanol, may optionally be present. The hydrolysis may be accelerated or completed by the application of heat.

According to a further feature of the invention we provide a process for the manufacture of oxazole derivatives of the formula:

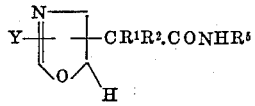

wherein Y has the meaning stated above, $R^1$ and $R^2$ stand for hydrogen or an alkyl radical of not more than 3 carbon atoms, and $R^5$ stands for hydrogen, or a hydroxy, amino or dialkylaminoalkyl radical, and salts thereof, which comprises reacting a compound of the formula:

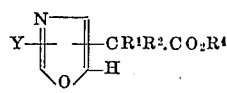

wherein Y, $R^1$ and $R^2$ have the meanings stated above, and $R^4$ stands for an alkyl, phenyl or benzyl radical, with a compound of the formula $R^5NH_2$, wherein $R^5$ has the meaning stated above.

As a suitable value for $R^4$ when it stands for an alkyl radical there may be mentioned an alkyl radical of not more than 5 carbon atoms, for example the methyl or ethyl radical. The reaction may optionally be carried out in a diluent or solvent, for example methanol, and it may optionally be accelerated or completed by the application of heat.

According to a further feature of the invention we provide a process for the manufacture of esters of the formula:

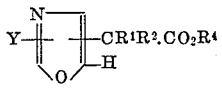

wherein Y has the meaning stated above, and $R^1$ and $R^2$ stand for hydrogen or an alkyl radical of not more than 3 carbon atoms, and $R^4$ stands for an alkyl, dialkylaminoalkyl or benzyl radical, which comprises reacting a salt of the formula:

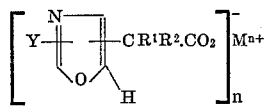

wherein Y, $R^1$ and $R^2$ have the meanings stated above, and $M^{n+}$ stands for a cation, and $n$ is an integer the value of which depends upon the valency of M, with a compound of the formula $R^4Hal$, wherein $R^4$ and Hal have the meanings stated above.

As a suitable value for $M^{n+}$ there may be mentioned, for example, a quaternary ammonium ion, for example the $NHEt_3^+$ ion, or a cation derived from a metal, for example an alkali metal or an alkaline earth metal.

The reaction may be carried out in a diluent or solvent, for example dimethylformamide, and it may be accelerated or completed by the application of heat.

According to a further feature of the invention we provide a process for the manufacture of esters of the formula:

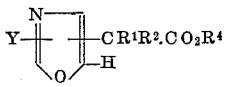

wherein Y has the meaning stated above, $R^1$ and $R^2$ stand for hydrogen or an alkyl radical of not more than 3 carbon atoms, and $R^4$ stands for an alkyl, dialkylaminoalkyl, benzyl or phenyl radical, which comprises reacting the approprite carboxylic acid with a compound of the formula $R^4OH$, wherein $R^4$ has the meaning stated above, in the presence of dicyclohexylcarbodiimide or an inorganic acid, for example sulphuric acid.

The reaction may be carried out in a diluent or solvent, and the reaction involving an inorganic acid may be accelerated or completed by the application of heat.

According to a further feature of the invention we provide a process for the manufacture of oxazole derivatives of the formula:

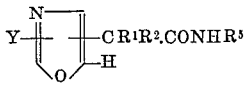

wherein Y, $R^1$ and $R^2$ have the meanings stated above, and $R^5$ stands for a dialkylaminoalkyl or alkoxycarbonylalkyl radical, and salts thereof, which comprises reacting the appropriate carboxylic acid with an amine of the formula $R^5NH_2$, wherein $R^5$ has the meaning stated above, and dicyclohexylcarbodiimide.

The reaction may be carried out in a diluent or solvent, for example dry chloroform, at a relatively low temperature, for example 0–10° C. The products in which $R^5$ stands for an alkoxycarbonylalkyl radical (and $R^2$ stands for hydrogen or an alkyl radical of not more than 3 carbon atoms) can be hydrolysed by reaction with an inorganic base, for example an alkali metal hydroxide, in the presence of water to give the corresponding compounds wherein $R^5$ stands for a carboxylalkyl radical.

According to a further feature of the invention we provide a process for the manufacture of oxazole derivatives of the formula:

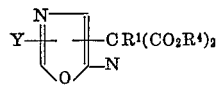

wherein Y and $R^1$ have the meanings stated above, and $R^4$ stands for an alkyl radical, which comprises reacting sodium or potassium, or a hydride, amide or alkoxide thereof, with a carbonate of the formula $CO.(OR^4)_2$, wherein $R^4$ has the meaning stated above, and a compound of the formula:

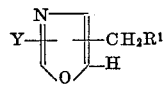

wherein Y and $R^1$ have the meanings stated above.

The reaction may be carried out in an excess of the appropriate carbonate, and it may be accelerated or completed by the application of heat.

According to a further feature of the invention we provide a process for the manufacture of oxazole derivatives of the formula:

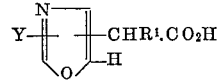

wherein Y and $R^1$ have the meanings stated above, and salts thereof, which comprises reacting a compound of the formula:

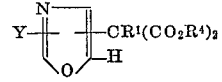

wherein Y and $R^1$ have the meanings stated above and $R^4$ stands for an alkyl radical, with an inorganic base in the presence of water and under the influence of heat.

It will be understood that in this reaction hydrolysis and decarboxylation occur. As a suitable base there may be mentioned, for example, an alkali metal hydroxide.

According to a further feature of the invention we provide pharmaceutical compositions comprising at least one oxazole derivative of the formula:

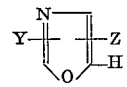

wherein Y and Z have the meanings stated above, or a salt thereof, and an inert, pharmaceutically-acceptable diluent or carrier.

The pharmaceutical compositions may be in a form suitable for oral administration, for example tablets, pills, capsules, solutions or suspensions, or in a form suitable for parenteral administration, for example sterile injectable solutions or suspensions, or in a form suitable for topical administration, for example creams, lotions or ointments. The compositions contain conventional pharmaceutical excipients, and they may be manufactured by conventional techniques.

The pharmaceutical compositions of the invention may contain, in addition to at least one of the oxazole derivatives that characterise this invention, one or more known agents having anti-inflammatory and/or analgesic activity, for example acetylsalicylic acid, phenylbutazone, chloroquine, codeine or paracetomol.

The invention is illustrated but not limited by the following examples in which the parts are by weight:

Example 1

A mixture of 2.5 parts of 2-(4-chlorophenyl)-4-cyanomethyloxazole, 10 parts of dry ethanol, and 8 parts of concentrated sulphuric acid is heated at 100° C. for 10 hours. The solution is poured into 100 parts of an ice-water mixture, and the resulting mixture is filtered. The solid residue is ethyl 2-(4-chlorophenyl)-oxazol-4-ylacetate, M.P. 60–62° C.

In a similar manner ethyl 2-phenyloxazol-4-ylacetate is obtained from the known compound 4-cyanomethyl-2-phenyl oxazole.

The 2-(4-chlorophenyl)-4-cyanomethyloxazole used as starting material may be obtained as follows:

A mixture of 17.5 parts of 2-(4-chlorophenyl)-oxazol-4-carboxylic acid (prepared from 4-chlorobenzonitrile by analogous method to that known for the preparation of the corresponding 2-phenyloxazole derivative) and 90 parts of thionyl chloride is refluxed for 2 hours. Volatile material is evaporated in vacuo at 40° C., and the residue is crystallised from petroleum ether (B.P. 60–80° C.). There is thus obtained 2(4-chlorophenyl)oxazol-4-carbonyl chloride, M.P. 120–122° C. 5.7 parts of sodium borohydride are added to a solution of 11.9 parts of this chloro compound in 150 parts of dry dioxan. The mixture is heated at 100° C. and is then cooled. 2 parts of water are added, and volatile solvents are evaporated in vacuo at 50° C. The residual solid is mixed with 350 parts of dilute hydrochloric acid, and the mixture is extracted five times with 200 parts of ether. The combined ethereal extracts are dried (anhydrous sodium sulphate), and the solution is evaporated to a small volume. The resulting mixture is filtered; the solid residue is 2-(4-chlorophenyl)-4-hydroxymethyloxazole, M.P. 151–152° C.

To a solution of 8 parts of this hydroxymethyl derivative in 250 parts of dry benzene there is slowly added a solution of 20 parts of phosphorus pentabromide in 400 parts of dry benzene. The resulting mixture is evaporated to dryness, and the residue is stirred with a mixture of water and ice. The resulting mixture is filtered, and the solid residue is crystallised from aqueous methanol. There is thus obtained 4-bromoethyl-2-(4-chlorophenyl)oxazole, M.P. 110–111° C.

A solution of 5.5 parts of 4-bromomethyl-2-(4-chlorophenyl)oxazole in 40 parts of warm 2-ethoxyethanol is added to a solution of 1.18 parts of sodium cyanide in 4 parts of water at 80° C. The mixture is heated at 100° C. for 3½ hours, and 300 parts of water are then added. The resulting mixture is filtered, and the residual solid is crystallised from aqueous methanol. There is thus obtained 2-(4-chlorophenyl)-4-cyanomethyloxazole, M.P. 120–121.5° C.

Example 2

A mixture of 2.76 parts of ethyl 2-(4-chlorophenyl) oxazol-4-ylacetate and 30 parts of 1 N-sodium hydroxide solution is refluxed for 10 minutes and then acidified with 2 N-hydrochloric acid. The mixture is chilled in ice and filtered. The solid residue is crystallised from aqueous methanol, and there is thus obtained 2-(4-chlorophenyl) oxazol-4-ylacetate acid, M.P. 187–189° C.

In a similar manner, starting with ethyl 2-phenyloxazol-4-ylacetate, there is obtained 2-phenyloxazol-4-ylacetic acid, M.P. 152–153° C.

Example 3

A mixture of 1 part of 2-(4-chlorophenyl)-4-cyanomethyloxazole in 8 parts of concentrated sulphuric acid is kept at ambient temperature for 4 hours. The solution is poured into 50 parts of water, and the resulting mixture is filtered. The solid residue is crystallised from aqueous ethanol, and there is thus obtained 2(4-chlorophenyl)oxazol-4-ylacetamide, M.P. 193–194° C.

In a similar manner, starting with 4-cyanomethyl-2-phenyloxazole, there is obtained 2-phenyloxazol-4-ylacetamide, M.P. 184–185° C.

Example 4

16 Parts of p-chlorobenzamide and 20 parts of ethyl γ-bromoacetoacetate are heated together at 120–130° C. for 1 hour. The mixture is cooled and stirred with 100 parts of ethyl acetate, and then filtered. The solid residue is washed with ether and then stirred with a mixture of 50 parts of water and 50 parts of ether. The ether layer is separated, washed with 15% aqueous sodium bicarbonate and then with water. The ether solution is dried over anhydrous magnesium sulphate and filtered, and the filtrate is evaporated to dryness in vacuo. There is thus obtained ethyl 2-(4-chlorophenyl)oxazol - 4 - ylacetate, M.P. 60–62° C.

Example 5

A solution of 2.45 parts of ethyl 2-(4-chlorophenyl) oxazol-4-ylacetate in 30 parts of dry ether is added to a solution of 0.37 part of sodamide in 50 parts of liquid ammonia at −70° C. 1.3 parts of methyl iodide are then added and the mixture is stirred at −70° C. for 1 hour, and 0.53 part of ammonium chloride is added. The ammonia is allowed to evaporate and the residual ethereal solution is washed with 15% aqueous sodium bicarbonate and then with water. The ether solution is dried over anhydrous magnesium sulphate and filtered, and the ether is removed in vacuo from the filtrate. The residue is fractionally distilled in vacuo, and there is obtained ethyl α-[2-(4-chlorophenyl)oxazol - 4 - ylpropionate], B.P. 158–162° C./0.7 mm.

Example 6

A mixture of 1 part of 2(4-chlorophenyl)-4-cyanomethyloxazole, 1 part of potassium hydroxide and 10 parts of 50% aqueous ethanol is heated at 100° C. for 4 hours and then evaporated to dryness in vacuo. The residual solid is dissolved in water, and the solution is acidified with glacial acetic acid. The mixture is chilled in ice and filtered. The solid residue is crystallised from aqueous methanol, and there is obtained 2-(4-chlorophenyl)oxazol-4-ylacetic acid, M.P. 187–189° C.

In a similar manner, starting with 2-(4-chlorophenyl)-oxazol-4-ylacetamide instead of 2-(4-chlorophenyl)-4-cyanomethyloxazole there is obtained 2-(4-chlorophenyl)-oxazol-4-ylacetic acid, M.P. 187–189° C.

In a similar manner, starting with 4-cyanomethyl-2-(2-fluorophenyl)oxazole, there is obtained 2-(2-fluorophenyl)oxazol-4-ylacetic acid, M.P. 225° C. In a similar manner starting with 2-(3-chlorophenyl)oxazol-4-ylacetamide there is obtained 2-(3-chlorophenyl)oxazol-4-ylacetic acid, M.P. 134–6° C.

In a similar manner, starting with 4-cyanomethyl-2-(3,4-dichlorophenyl)oxazole instead of 2-(4-chlorophenyl)-4-cyanomethyloxazole there is obtained 2-(3,4-dichlorophenyl)oxazol-4-ylacetic acid, M.P. 147–148° C.

In a similar manner, starting with 4-cyanomethyl-2-(4-trifluoromethylphenyl)oxazole instead of 2-(4-chlorophenyl)-4-cyanomethyloxazole there is obtained 2-(4-trifluoromethylphenyl)oxazol-4-ylacetic acid, M.P. 154–156° C.

In a similar manner, starting with 2-(4-chlorobenzyl)-4-cyanomethyloxazole instead of 2-(4-chlorophenyl)-4-cyanomethyl oxazole there is obtained 2-(4-chlorobenzyl)oxazol-4-ylacetic acid, M.P. 134–135° C.

The cyanomethyl compounds used in this example or some of the following examples can be obtained as follows:

A solution of 70 parts of 4-chloromethyl-2-(4-fluorophenyl)oxazole in 350 parts of 2-ethoxyethanol is added over 30 minutes at 90° C. to a stirred solution of 21.1 parts of sodium cyanide in 40 parts of water. The mixture is stirred for a further 3 hours and then poured into 1000 parts of stirred water, and the resulting mixture is filtered. The solid residue is crystallised from aqueous methanol, and there is thus obtained 4-cyanomethyl-2-(4-fluorophenyl)oxazole, M.P. 109–111° C.

In essentially similar manner there are obtained:

2-(4-bromophenyl)-4-cyanomethyloxazole,
 M.P. 134–135° C.
2-(3-chlorophenyl)-4-cyanomethyloxazole,
 M.P. 114–120° C.

2-(4-chlorobenzyl)-4-cyanomethyloxazole
2-(3,4-dichlorophenyl)-4-cyanomethyloxazole
2-(4-trifluoromethylphenyl)-4-cyanomethyloxazole
2-(2-fluorophenylphenyl)-4-cyanomethyloxazole,
   M.P. 103–5° C.

The chloromethyl compounds used as starting materials in the preparation of the above cyanomethyl compounds can be obtained as follows:

A mixture of 15.5 parts of p-chlorobenzamide, 12.7 parts of 1,3-dichloroacetone and 250 parts of toluene are boiled under reflux for 24 hours. The mixture is cooled and filtered from unchanged p-chlorobenzamide. The filtrate is evaporated to dryness in vacuo. The residual gum is crystallised from aqueous methanol, and there is obtained 4-chloromethyl-2-(4-chlorophenyl)oxazole, M.P. 90–91° C.

In essentially similar manner there are obtained:

4-chloromethyl-2-(3-chlorophenyl)oxazole,
   M.P. 71–72° C.
2-(4-bromophenyl)-4-chloromethyloxazole,
   M.P. 115–117° C.
4-chloromethyl-2-(2-fluorophenyl)oxazole
4-chloromethyl-2-(4-fluorophenyl)oxazole,
   M.P. 74–76° C.
4-chloromethyl-2-(3,4-dichlorophenyl)oxazole
2-(4-chlorobenzyl)-4-chloromethyloxazole
2-(4-trifluoromethylphenyl)-4-chloromethyloxazole,
   M.P. 76–78° C.

Example 7

A solution of 4.4 parts of 2-(4-chlorophenyl)-4-cyanomethyloxazole in 50 parts of dry tetrahydrofuran is added to a solution of 3.2 parts of sodamide in 100 parts of liquid ammonia at −70° C. 2.5 parts of methyl iodide are added and the mixture is stirred at −70° C. for 1 hour. 4 parts of ammonium chloride are then added. The ammonia is allowed to evaporate and the residual mixture is poured into 200 parts of water and extracted with 3 separate portions (50 parts each) of benzene. The combined benzene extracts are washed with water and evaporated to dryness in vacuo. The gummy residue is 2-(4-chlorophenyl)-4-(α-cyanoisopropyl)oxazole. To this residue is added a solution of 5 parts of potassium hydroxide in 50 parts of 50% aqueous ethanol. This mixture is boiled under reflux for 4 hours and then evaporated to dryness in vacuo. The residual solid is dissolved in water and the solution is acidified with acetic acid. This mixture is extracted with 50 parts of benzene, and the benzene extract is washed with water, dried over anhydrous magnesium sulphate and filtered, and the filtrate is evaporated to dryness. The residue is crystallised from cyclohexane. There is thus obtained α-[2-(4-chlorophenyl)-oxazol-4-yl]isobutyric acid, M.P. 140° C.

Example 8

In a similar manner to that described in Example 1 and starting with 4-cyanomethyl-2-(4-fluorophenyl)oxazole, there is obtained ethyl 2-(4-fluorophenyl)oxazol-4-ylacetate, M.P. 66–67° C.

In a similar manner, starting with 2-(4-bromophenyl)-4-cyanomethyloxazole there is obtained ethyl 2-(4-bromophenyl)oxazol-4-ylacetate, M.P. 69–70° C.

Example 9

In a similar manner to that described in Example 2 and starting with ethyl 2-(4-bromophenyl)-oxazol-4-ylacetate, there is obtained 2-(4-bromophenyl)-oxazol-4-ylacetic acid, M.P. 205–207° C. with decomposition.

In a similar manner, starting with ethyl 2-(4-fluorophenyl)oxazol-4-ylacetate there is obtained 2-(4-fluorophenyl)oxazol-4-ylacetic acid, M.P. 168–169° C.

In a similar manner, starting with ethyl α-[2-(4-chlorophenyl)oxazol-4-yl]propionate there is obtained α-[2-(4-chlorophenyl)oxazol-4-yl]propionic acid, M.P. 120–122° C.

Example 10

In a similar manner to that described in Example 3 and starting with 2-(3-chlorophenyl)-4-cyanomethyloxazole, there is obtained 2-(3-chlorophenyl)-oxazol-4-ylacetamide, M.P. 175–177° C.

Example 11

1.4 parts of hydroxylamine hydrochloride are dissolved in 20 parts of methanol, and the solution is added to a solution of 1.2 parts of sodium methoxide in 10 parts of methanol. The precipitated sodium chloride is removed by filtration, and to the filtrates are added 2.5 parts of methyl 2-(4-chlorophenyl)oxazol-4-ylacetate. After 5 days the mixture is filtered and the solid residue is washed with methanol, dissolved in methanol and the solution acidified with acetic acid. The precipitate so obtained is collected and crystallised from methanol. There is thus obtained 2-(4-chlorphenyl)-oxazol-4-ylacethydroxamic acid, M.P. 200° C. with decomposition.

Example 12

A mixture containing 1 part methyl 2-(4-chlorophenyl)oxazol-4-ylacetate, 1 part of 64% hydrazine hydrate and 5 parts of methanol is heated under reflux for 30 minutes. The solution is cooled, and the solid which separates out is collected by filtration. The solid is crystallised from methanol to give 2-(4-chlorophenyl)oxazol-4-ylacethydrazide, M.P. 198–199° C.

Example 13

A mixture of 5 parts of 3-dimethylaminopropylamine and 2.5 parts of methyl 2-(4-chlorophenyl)oxazol-4-ylacetate is heated at 90° C. for 16 hours and then evaporated to dryness in vacuo. The solid residue is crystallised from a mixture of benzene and petroleum ether (B.P. 60–80° C.), and there is obtained 2-(4-chlorophenyl)-N-(3-dimethylaminopropyl)oxazol - 4 - ylacetamide, M.P. 102–103° C.

Example 14

A mixture of 2.4 parts of 2-(4-chlorophenyl)-oxazol-4-ylacetic acid, 1.5 parts of 2-dimethylaminoethyl chloride, 2.1 parts of triethylamine and 10 parts of N,N-dimethylformamide is heated at 90° C. for 16 hours, and then cooled and diluted with ether. The resulting precipitate of triethylamine hydrochloride is removed by filtration, and the filtrate is extracted with 50 parts of 5% aqueous acetic acid. The aqueous phase is separated, washed with petroleum ether (B.P. 100–120° C.), basified to pH 10 by the addition of aqueous sodium carbonate, and extracted with ether. The ethereal solution is washed with water, dried over anhydrous magnesium sulphate and treated with a slight excess of ethereal hydrogen chloride. There is thus obtained β-dimethylaminoethyl 2-(4-chlorophenyl)oxazol-4-ylacetate hydrochloride, as a low melting hygroscopic solid.

Example 15

A mixture of 12.6 parts of 2-(4-chlorophenyl)-4-cyanomethyloxazole, 60 parts of methanol, and 40 parts of concentrated sulphuric acid is heated at 90° C. for 4 hours. The mixture is poured into 250 parts of an ice-water mixture and extracted with 50 parts of benzene. The benzene extract is separated, washed with 100 parts of 5% ammonium hydroxide and then with 100 parts of water. The extract is dried with anhydrous magnesium sulphate, and the solvent is evaporated in vacuo. The residue is crystallised from petroleum ether (B.P. 60–80° C.) and there is obtained methyl 2-(4-chlorophenyl)oxazol-4-ylacetate, M.P. 90° C.

Example 16

A mixture of 1 part of 2-(4-chlorophenyl)oxazol-4-ylacetic acid, 10 parts of methanol and 8 parts of concentrated sulphuric acid is heated on the steam bath for 16 hours. The mixture is cooled and poured on to 100 parts of an ice-water mixture which is then extracted with 50 parts of ether. The ethereal extract is washed with water and then with 5% aqueous ammonium hydroxide. The extract is dried over anhydrous magnesium sulphate and the solvent is evaporated in vacuo. The residue is crystallised from petroleum ether (B.P. 60–80° C.). There is thus obtained methyl 2-(4-chlorophenyl)oxazol-4-ylacetate, M.P. 90° C.

In a similar manner using n-butanol instead of methanol there is obtained n-butyl 2-(4-chlorophenyl)-4-ylacetate, M.P. 51–52° C.

Example 17

4.7 parts of 2-(4-chlorophenyl)oxazol-4-ylacetic acid and 3.1 parts of glycine methyl ester hydrochloride are suspended in 75 parts of dry chloroform, and 3.4 parts of triethylamine are added. The resulting solution is cooled to a temperature not exceeding 10° C., and 5 parts of dicylcohexylcarbodiimide are added. The mixture is stirred at ambient temperature for 16 hours and then filtered. The filtrate is washed twice with 50 parts of 5% w./v. ammonium hydroxide solution and is then washed twice with 50 parts of water. The solution is dried with anhydrous magnesium sulphate and filtered. 75 parts of dry ether are added to the filtrate, and saturated ethereal hydrogen chloride is then added until precipitation is complete. The liquid is decanted off and the semi-solid residue is washed by decantation with dry ether. The residue is then shaken with a mixture of 30 parts of 10% w./v. sodium bicarbonate solution and 50 parts of chloroform. The chloroform layer is separated, washed twice with 100 parts of water, and then dried with anhydrous magnesium sulphate. The solvent is evaporated in vacuo and the residue is crystallised from a mixture of benzene and petroleum ether (B.P. 60–80° C.). There is thus obtained methyl α-[2-(4-chlorophenyl)oxazol-4 - ylacetamido]acetate, M.P. 116–118° C.

1 part of methyl α - [2 - (4 - chlorophenyl)oxazol-4 - ylacetamido]acetate, 20 parts of methanol and 20 parts of water are stirred at ambient temperature and made alkaline to pH 11 by the addition of 10 N-sodium hydroxide solution. The mixture is kept at ambient temperature for 16 hours and then filtered. The filtrate is acidified to pH 5 with glacial acetic acid, and the resulting mixture is filtered. There is then obtained α - [2 - (4-chlorophenyl)oxazol - 4 - ylacetamido]acetic acid, M.P. 226–228° C.

Example 18

A mixture of 1 part of 2 - methyl - 4 - phenyloxazole, 0.75 part of sodium hydride and 10 parts of diethyl carbonate is boiled under reflux for 4 hours. The mixture is cooled, poured into 10 parts of water, and acidified with 2 N-hydrochloric acid. The mixture is extracted twice with ether. The combined ethereal extracts are washed with water, and then dried over anhydrous sodium sulphate, filtered and evaporated to dryness in vacuo. The residue is diethyl 2 - (4 - phenyloxazol - 2-yl)malonate.

This compound is boiled under reflux for 1 hour with 30 parts of 2 N-sodium hydroxide. After cooling, the mixture is washed with 10 parts of ether, and the aqueous layer is separated and acidified at 0° C. with 2 N-hydrochloric acid. The resulting precipitate is separated by filtration, and washed with water and then with ethanol. There is thus obtained 4 - phenyloxazol - 2 - ylacetic acid, M.P. 132° C. with decomposition.

In an essentially similar manner there is obtained from 4 - (4 - bromophenyl) - 2 - methyloxazole: diethyl 4-(4 - bromophenyl)oxazol - 2 - ylmalonate, and 4 - (4-bromophenyl)oxazol - 2 - ylacetic acid, M.P. 111–112° C. with decomposition.

The 4 - (4 - bromophenyl) - 2 - methyloxazole used as starting material may be obtained as follows:

25 parts of acetamide are heated to 120° C., and 70 parts of 4 - bromophenacyl bromide are added portionwise over 1 hour with good agitation. After a further 1½ hours at 120–140° C., the mixture is cooled, and 150 parts of water and 150 parts of chloroform are added. The mixture is shaken and then separated, and the chloroform layer is evaporated in vacuo. The residual solid is crystallised from 50% v./v. aqueous ethanol to give 4 - (4 - bromophenyl) - 2 - methyloxazole, M.P. 98–99° C.

Example 19

30 parts of dry dimethylformamide are added to 2 parts of a 50% dispersion of sodium hydride in oil. 6 parts of diethyl 4-phenyloxazol - 2 - ylmalonate (see Example 18) in 30 parts of dry dimethylformamide are added in the above mixture. After agitation for 1 hour, 6 parts of methyl iodide are added over 10 minutes, and agitation is continued for 2 hours. The mixture is poured into a mixture of 100 parts of water, 6 parts of acetic acid and 100 parts of ether. The ethereal layer is separated and washed with excess aqueous sodium bicarbonate. The ether is then evaporated in vacuo to give crude diethyl α - (4 - phenyloxazol - 2 - yl) - α - methylmalonate.

This diethyl derivative is mixed with 2 parts of sodium hydroxide, 15 parts of water and 15 parts of ethanol, and the mixture is refluxed for 1 hour. The mixture is cooled, diluted with 30 parts of water, and washed with 30 parts of ether. The aqueous layer is cooled to 0° C. and acidified with concentrated hydrochloric acid. The resulting mixture is filtered to give, as solid residue α-(4 - phenyloxazol - 2 - yl) propionic acid, M.P. 126–127° C. with decomposition.

Example 20

1 part of 2 - (4 - chlorophenyl)oxazol - 4 - ylacetic acid is dissolved in 20 parts of hot 5% aqueous ammonium hydroxide, and 5 parts of 10 N-sodium hydroxide are added. After cooling, the precipitate is collected by filtration and crystallised from water. There is thus obtained sodium 2 - (4 - chlorophenyl)oxazol - 4 - ylacetate, M.P. over 200° C.

2.6 parts of sodium 2 - (4 - chlorophenyl)oxazol-4-ylacetate are dissolved in 30 parts of boiling water, and 2 parts of calcium chloride in 20 parts of water are added. The precipitate is collected by filtration, washed with water, and dried. There is thus obtained calcium 2 - (4 - chlorophenyl)oxazol - 4 - ylacetate.

2.6 parts of sodium 2 - (4 - chlorophenyl)oxazol - 4 - ylacetate are dissolved in 30 parts of boiling water, and a solution of 2 parts of aluminum nitrate in 20 parts of water is added. After cooling, the precipitate is collected by filtration, and then washed with water and dried. There is thus obtained aluminum 2 - (4 - chlorophenyl)oxazol - 4 - ylacetate.

Example 21

A mixture of 100 parts of 2 - (4 - chlorophenyl)-oxazol - 4 - ylacetic acid and 300 parts of maize starch is granulated with a sufficient quantity of 10% w./v. starch paste. The granules are passed through a 20-mesh screen and are dried at a temperature not exceeding 50° C. The dried granules are blended with 4 parts of magnesium stearate and compressed into tablets which contain from 50 to 250 mg. of active ingredient. There are thus obtained tablets suitable for therapeutic purposes.

Instead of the 100 parts of 2 - (4 - chlorophenyl)-oxazol - 4 - ylacetic acid there may be used 100 parts of α - [2 - (4 - chlorophenyl)oxazol - 4 - yl]propionic acid, and in a similar manner there are obtained tablets suitable for oral administration for therapeutic purposes.

Example 22

50 parts of micronised 2 - (4 - chlorophenyl) - oxazol-4 - ylacetic acid are mixed with 130 parts of lactose and 35 parts of a 10% w./v. aqueous gelatine solution, and the mixture is granulated. 24.5 parts of maize starch are mixed with the granules, and 2 parts of magnesium stearate are then added. The mixture is compressed into tablets containing 50 mg. of active ingredient. There are thus obtained tablets which are suitable for oral administration for therapeutic purposes.

EXAMPLE 23

5 parts of 2-(4-chlorophenyl)oxazol-4-ylacetic acid are added to a stirred mixture of 9 parts of liquid paraffin and 60 parts of white soft paraffin heated at 65° C. Stirring is continued until the mixture is cool. There is thus obtained an ointment suitable for topical application for therapeutic purposes.

EXAMPLE 24

To a stirred mixture of 20 parts of stearic acid, 15 parts of arachis oil, 5 parts of liquid paraffin and 0.5 part of cetostearyl alcohol heated at 65° C. there is added a solution at 60° C. prepared from 5 parts of 2-(4-chlorophenyl)oxazol-4-ylacetic acid, 0.75 part of triethanolamine and 53.75 parts of water. Stirring is continued after mixing while the temperature is allowed to fall to 40° C. The mixture is then homogenised by passage through a colloid mill. There is thus obtained a vanishing cream suitable for topical application for therapeutic purposes.

The oxazole derivatives of this invention are active in procedures that are standard in the art for testing for anti-inflammatory agents, for analgesic agents, and for antipyretic agents. These results were obtained in standard experimental animals (rats or mice), and they presumptively indicate corresponding utilities in man. On the basis of these results in standard experimental animals and data obtained in related laboratory studies, we consider that it is reasonable to expect that said oxazole derivatives could be used clinically in man in the following forms and at the following doses, depending upon the clinical effect that is desired:

(1) Anti-inflammatory effect.—The agent is expected to be administered orally, for example in tablet form, and the total daily oral dose is expected to be 100–500 mg. of active ingredient, for example 2-(4-chlorophenyl)oxazol-4-ylacetic acid, per 70 kg. man. Alternatively, the agent is expected to be administered topically in the form of, for example, an ointment or cream containing 2.5–7.5% by weight of active ingredient, for example 2-(4-chlorophenyl)oxazol-4-ylacetic acid, which would be administered as necessary.

(2) Analgesic effect.—The agent is expected to be administered orally, for example in tablet form, and the total daily oral dose is expected to be 100–600 mg. of active ingredient, for example 2-(4-chlorophenyl)oxazol-4-ylacetic acid, per 70 kg. man.

(3) Antipyretic effect.—The agent is expected to be administered orally, for example in tablet form, and the total daily oral dose is expected to be 100–500 mg. of active ingredient, for example 2-(4-chlorophenyl)oxazol-4-ylacetic acid, per 70 kg. man.

What I claim is:

1. An oxazole derivative of the formula:

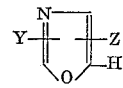

wherein Y stands for phenyl or benzyl, or phenyl or benzyl substituted in the benzene ring with at most two halogen atoms or with trifluoromethyl, and Z stands for a group of the formula —$CR^1R^2R^3$, wherein $R^1$ stands for hydrogen or alkyl of not more than 3 carbon atoms, $R^2$ stands for hydrogen, alkyl of not more than 3 carbon atoms or alkoxycarbonyl of not more than 6 carbon atoms, and $R^3$ stands for a group of the formula —$CO_2R^4$ or —$CONHR^5$, wherein $R^4$ stands for hydrogen, alkyl of not more than 5 carbon atoms, dialkylaminoalkyl of not more than 8 carbon atoms, benzyl or phenyl, and $R^5$ stands for hydrogen, hydroxy, amino, dialkylaminoalkyl of not more than 8 carbon atoms, alkoxycarbonylalkyl of not more than 5 carbon atoms, or carboxyalkyl of not more than 3 carbon atoms, or a non-toxic, pharmaceutically acceptable salt thereof.

2. A compound as claimed in claim 1 wherein Y stands for phenyl or benzyl, or phenyl or benzyl substituted in the benzene ring with at most two halogen atoms selected from fluorine, chlorine and bromine atoms, or with trifluoromethyl, and Z stands for a group of the formula —$CR^1R^2R^3$, wherein $R^1$ stands for hydrogen or methyl, $R^2$ stands for hydrogen, methyl or ethoxycarbonyl, and $R^3$ stands for a group of the formula —$CO_2R^4$ or —$CONHR^5$, wherein $R^4$ stands for hydrogen, alkyl of not more than 5 carbon atoms, dialkylaminoalkyl of not more than 8 carbon atoms, benzyl or phenyl, and $R^5$ stands for hydrogen, hydroxy, amino, dialkylaminoalkyl of not more than 8 carbon atoms, alkoxycarbonylalkyl of not more than 5 carbon atoms, or carboxyalkyl of not more than 3 carbon atoms, or a non-toxic, pharmaceutically acceptable salt thereof.

3. A compound as claimed in claim 1 and selected from the group consisting of 2-(4-chlorophenyl)oxazol-4-ylacetic acid, α-[2-(4-chlorophenyl)oxazol-4-yl]propionic acid, 2-(4-trifluoromethylphenyl)oxazol-4-ylactic acid, and 2-(4-bromophenyl)oxazol-4-ylacetic acid, and alkali metal, alkaline earth metal, and aluminum salts thereof.

References Cited

Chemical Abstracts, Adank et al. (1962), col. 14213–14.

ALEX MAZEL, Primary Examiner

BERNARD I. DENTZ, Assistant Examiner

U.S. Cl. X.R.

424—272